United States Patent [19]

Burger

[11] Patent Number: 5,472,722
[45] Date of Patent: Dec. 5, 1995

[54] LOW SALT CURING PROCESS FOR PREPARING DRY CURED COUNTRY HAM

[75] Inventor: Morris F. Burger, California, Mo.

[73] Assignee: Burgers' Ozark Country Cured Hams, Inc., California, Mo.

[21] Appl. No.: 303,527

[22] Filed: Sep. 9, 1994

Related U.S. Application Data

[63] Continuation-in-part of Ser. No. 170,707, Dec. 21, 1993, abandoned.

[51] Int. Cl.$^6$ .................................................... A23B 4/023
[52] U.S. Cl. .................... 426/264; 426/393; 426/410; 426/412; 426/415; 426/641
[58] Field of Search .................................. 426/264, 265, 426/266, 393, 410, 641, 129, 415, 281, 412, 478

[56] References Cited

U.S. PATENT DOCUMENTS

| | | | |
|---|---|---|---|
| 2,101,547 | 12/1937 | Kistler | 426/264 |
| 4,085,231 | 4/1978 | Weston | 426/410 |
| 4,642,239 | 2/1987 | Ferrar et al. | 426/264 X |
| 4,753,809 | 6/1988 | Webb | 426/264 X |

FOREIGN PATENT DOCUMENTS

| | | | |
|---|---|---|---|
| 688839 | 6/1964 | Canada | 426/266 |
| 905744 | 7/1972 | Canada | 426/266 |
| 2338692 | 2/1975 | Germany | 426/264 |
| 8201640 | 5/1982 | WIPO | 426/129 |

*Primary Examiner*—Arthur L. Corbin
*Attorney, Agent, or Firm*—Hovey, Williams, Timmons & Collins

[57] ABSTRACT

A method of dry curing ham to prepare dry cured country ham by the steps of: treating a ham to displace residual blood and other fluids from the ham body; pre-salting the ham while mechanically abrading the skin portion thereof; applying a full curing agent to the ham; packaging the ham in a sealed vacuum pouch; maintaining the sealed ham under vacuum conditions for a time period sufficient to effect expression of residual fluids and blood from the ham body; opening the packaged ham to the atmosphere; subjecting the packaged ham to a chilled temperature over a period of time sufficient for the salt to enter the ham; drying the ham on a drying rack and then aging the ham.

3 Claims, 1 Drawing Sheet

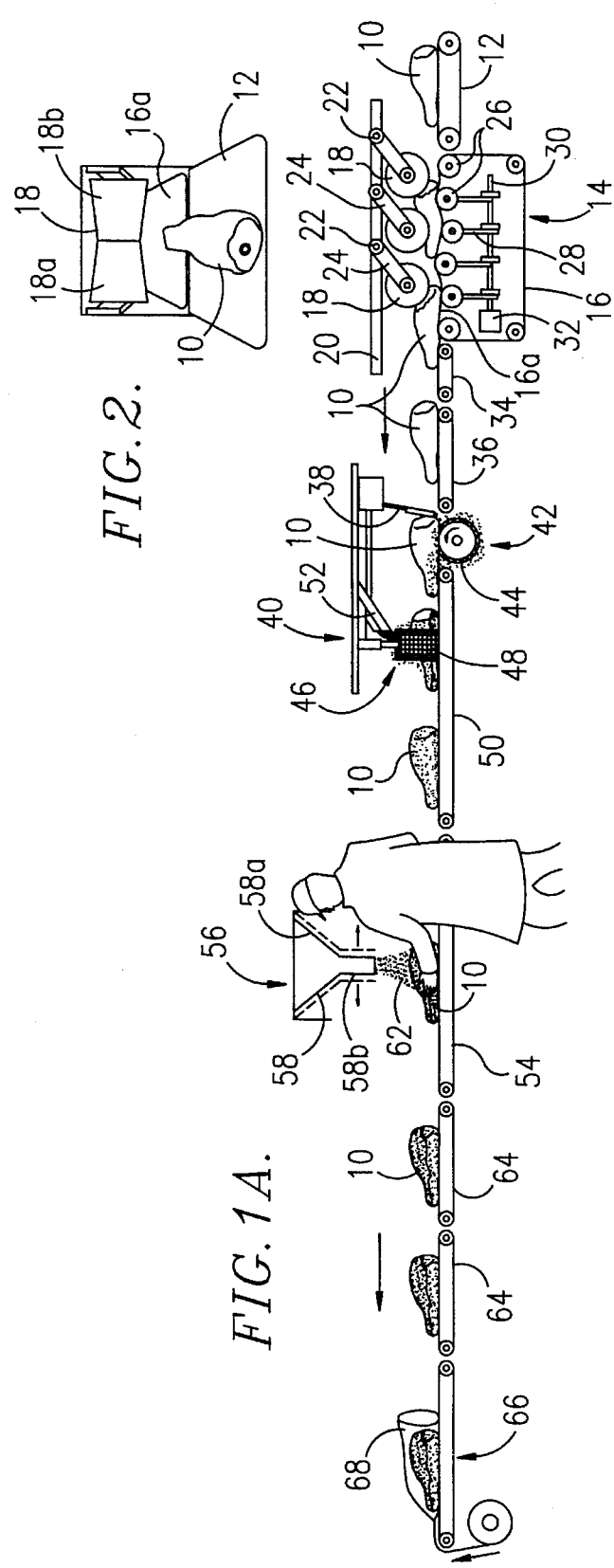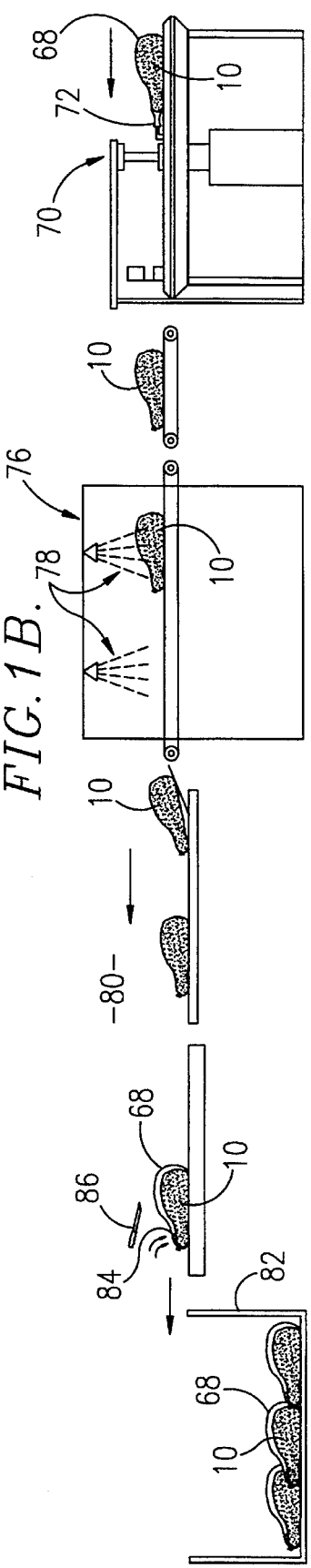

LOW SALT CURING PROCESS FOR PREPARING DRY CURED COUNTRY HAM

RELATED APPLICATION

This application is a continuation-in-part of pending Application No. 08/170,707, filed Dec. 21, 1993, now abandoned.

BACKGROUND OF THE INVENTION

1. Field of the Invention

This invention relates to a method of dry curing pork hams of the type generally known as dry cured country ham. It particularly concerns an improved method that allows full curing of a pork ham body at a salt level significantly less than is conventionally the case. The method does not adversely affect the quality of the meat product and in fact produces a tastier and more wholesome dry cured ham in part because of a final lower overall salt content.

2. Description of the Prior Art

Country ham refers to ham that is cured by introducing dry salt to the pork, and typically subjected to further process steps such as drying, aging, and smoking. The salt acts as a preservative and also imparts a characteristic flavor to the meat.

Applicable U.S.D.A. regulations pertaining to the dry curing of ham set out the amount of salt that must be applied to the meat, and prescribe time, temperature and processing parameters that must be adhered to by processors, as well as the minimum salt content of the cured ham. Present regulations include those set forth in 9 C.F.R. §318.10 and 9 C.F.R. §319.106, which are hereby incorporated by reference thereto.

The art recognizes a distinct difference between dry-cured salt ham products and wet cured brine products, as is exemplified by 9 C.F.R. §319.106(a), which defines "Country Ham" and "Dry Cured Ham" as a ham product that is prepared by the application of dry salt (NaCl), but "may not be injected with curing solutions nor placed in curing solutions." A list of dry cured country hams at least includes Italian-Style Prosciutto Ham; German-Style Black Forest, Westphalian Ham, and German Country Hams; as well as a variety of regionally significant United States hams, which may be distinguished as products resulting from subtle process variations.

Present industrial dry cured country ham preparation processes involve four major steps, including:

(1) curing the ham to introduce salt as a preservative;

(2) drying the ham to reduce the moisture content and allow the salt therein to become substantially equally distributed throughout the ham at non-perishable levels;

(3) aging the ham to a preferred taste; and (4) optionally smoking the ham to enhance its flavor and appearance.

In this four-part process, the curing step includes a number of sub-steps. Freshly slaughtered hams are trimmed, and a curing agent including salt is rubbed over the surface of each ham. After the curing agent is applied, the ham is typically wrapped in paper and tied within a cotton stockinette. The bound ham is next placed in a cooler for curing over an interval of time, which allows for the proper absorption of curing agent into the ham. Alternatively, after the curing agent has been applied, the wrapped or unwrapped hams may be placed on racks or in bins for curing. The unwrapped state enables re-salting of the hams in an overhaul procedure approximately 7 to 10 days after the curing agent is first applied.

Although current regulations provide generally that a country cured ham shall have a minimum salt content of at least about 4% by weight, it is industry practice to apply sufficient curing agent to the hams to assure a percent salt finished product containing from 5% to 6% salt. These high salt levels are employed in large measure because of the difficulty of assuring uniform diffusion of salt into the ham to prevent spoilage. However, ham containing salt at these relatively high levels has a distinctly salty taste, which tends to mask many desirable flavors that naturally occur in the cured meat.

Although a 4% by weight salt content is specified in U.S.D.A. regulations, a petition may be filed with the Administrator of the U.S.D.A. for approval of a final salt content in the ham of less than 4%, provided evidence is presented that the lower salt levels are effective in preventing spoilage of the meat.

SUMMARY OF THE INVENTION

This invention permits dry curing of pork hams at lower than conventional salt levels for enhanced flavor without sacrificing the keeping quality of the meat product. The amount of curing agent applied to each ham body should be sufficient to cause the ham to have a final salt content of a least about 2.5% to 3.5% by weight of the untreated ham. Flavor enhancement is accomplished, not only as a result of the lower salt content of the cured ham which renders the product less salty to the taste, but also because of the fact that there is less masking of the normal natural flavors of the meat.

Even though the salt-based curing agent is applied to the ham at a lower than normal level resulting in a lower salt concentration in the final cured product, the ham is adequately cured because of the unique way in which more uniform distribution of the curing agent is obtained.

The improved process of the present invention first broadly includes the step of treating each ham to displace residual blood and other fluids from the ham body. Next, the ham is pre-salted in conjunction with mechanical abrasion of the outer residual skin portion of the ham body. A dry salt-based curing agent is applied to the overall ham, and particularly the exposed flesh portion of the ham body.

The salted ham is then placed in a flexible, substantially air impervious, synthetic resin enclosure such as a bag or wrapper of a nature such that air may be removed from the interior of the enclosure. After sealing or closure of the bag or wrapper, a substantial proportion of the air within the enclosure is removed to create an environment therein which is below ambient pressure.

Next, the packaged ham body within the enclosure is maintained at below ambient pressure for a final fluid expression period of at least a few seconds and sufficient to cause any blood or other fluids remaining in the ham body to be substantially expressed therefrom. The bag is then opened either by breaking the seal at the normally open end of the bag, or forming holes or a slit in the bag to allow ambient air to re-enter the enclosure.

Thereafter, the ambient air exposed ham body is subjected to final curing conditions while retained in the bag for a time sufficient to effect salt cure thereof.

It is believed that a ham product having enhanced flavor and keeping qualities at lower than conventional salt levels is attributable to the fact that in accordance with the improved preferred steps of the process hereof: blood and other fluids are initially expressed from the ham body; pre-salting is effected in conjunction with mechanical abrasion of the skin portion of the ham; the final salt curing agent is applied directly to the exposed flesh portion of the ham; the ham is then packaged in an air impervious heat shrinkable film presenting a bag; air is removed to create a vacuum within the bag; the bag is subjected to heat sufficient to cause the film to shrink tightly against the ham; an initial, relatively short fluid expression step is carried out while the enclosure continues to tightly press on the surface of the ham which in conjunction with the vacuum existing within the enclosure causes any residual blood and fluids in the ham to be expressed; the bag is then perforated to allow air to enter the interior of the enclosure; and the ham is then subjected to curing under conventional times and conditions while retained in the bag and exposed to ambient air.

BRIEF DESCRIPTION OF THE DRAWINGS

FIGS. 1A and 1B are schematic representations of a process for carrying out the present invention in accordance of the preferred embodiment hereof and in each figure illustrates the sequence of operations which take place, with the order of the sequence being indicated by the direction of the arrows; and FIG. 2 is a schematic front elevational representation of the first treatment section of the process as indicated by the first processing step at the far right hand side of FIG. 1A.

DETAILED DESCRIPTION OF THE PREFERRED EMBODIMENT

The preferred process involves an improved method of preparing dry cured country ham for consumption. The overall ham preparation process preferably involves four major steps, including the steps of: (1) curing the ham by introducing salt to the ham as a preservative agent; (2) drying the ham to equalize the distributed curing agent ingredients while adjusting the distributed moisture/protein/salt ratios within the ham to nonperishable levels; (3) aging the ham to provide a particular taste; and (4) optionally smoking the ham to enhance the flavor and appearance of the finished country ham product.

Cured ham preparation begins in a conventional manner upon receiving trailer loads of fresh hams that preferably have been slaughtered less than 72 hours prior to arrival at the plant. The hams typically arrive in one-ton combo bins. The fresh hams may be, if necessary, trimmed to remove the excess flank, cod fat, and shank.

After arrival, a thermometer is used to spot check the internal temperature of representative hams from each bin for freshness quality control purposes. The hams at the time of arrival desirably have an internal temperature between about 35° F. to 45° F., and preferably between 36° F. and 40° F. The hams upon arrival are placed in holding coolers and at an appropriate time are transported to the curing stage.

The trimmed hams preferably are mechanically sorted by weight through utilization of conventional equipment and methods, in order to place hams within certain weight ranges in common bins. This sorting is most preferably done to a degree where the weight of hams in a common bin may vary by no more than about two to three pounds each.

The first curing stage of the overall process is separated into five separate phases which are illustrated schematically in sequence in FIGS. 1A and 1B of the drawing.

Phase I—Massaging and Vein Pressing

The ham bodies received from the weighing station each have a skin portion and an exposed flesh portion. The ham bodies 10 carried by a conveyor 12 are directed into a combination massaging and vein pressing unit 14. This unit serves to uniformly massage the joints of the ham, which are flexed, stretched and loosened, thus softening the tissues and allowing more homogeneous absorption of the salt. In addition, residual blood and other fluids are expressed from the ham.

As indicated by the schematic representation of FIG. 1A, unit 14 includes a conveyor belt 16 which includes a normally uppermost horizontal stretch 16a located to receive hams 10 delivered to unit 14 by conveyor 12. The belt 16 is caused to move in a counterclockwise direction as depicted in FIG. 1A, whereby the hams 10 move from right to left in that Figure. A series of elongated, longitudinally concave rollers 18 are mounted on an overhead support 20 for pivoting action about respective pivot points 22. Pneumatic means is preferably provided for exerting a downward force on respective lever arms 24 to bias respective rollers 18 toward the conveyor stretch 16a and thereby hams transported along the length of the unit 14. The optimum pressure exerted by the rollers on the hams is 0.5 to 2.5 kg/cm$^2$. The pressure exerted by rollers 18 on hams 10 not only rids the meat product of blood that may still be present in the circulatory system of the ham body, but also serves to purge from the veins and arteries any bacteria or other waste that might have accumulated in these areas thereby reducing the chance of spoilage or off flavors.

The external circumferential surface of each roller 18 can best be seen in FIG. 2, wherein it is to be noted that two frusto-conical sections 18a and 18b are joined end to end with the narrowest extremities thereof in proximal relationship. Thus, as the hams 10 are conveyed beneath each roller 18, the frusto-conical surfaces of sections 18a and 18b ride over and press downwardly on each of the hams 10 to exert a massaging action on respective hams.

A series of pressing elements 26 are located below conveyor stretch 16a of conveyor 16 and may consist of rollers, or bars having curved or inclined surfaces on the upper portions thereof in contact with the underside of stretch 16a of belt 16. Each of the pressing elements 26 is carried by crank structure 28 on crankshaft 30 driven by motor 32. Crank structure 28 and associated crankshaft 30 function to cause adjacent elements 26 to be moved upwardly and then retracted in a sequence such that as one element moves upwardly, the next adjacent element is caused to move downwardly in timed relationship thereto.

The elements 26 pushing upwardly on the stretch 16a of belt 16 exert an upward force on hams 10 trapped between a respective roller 18 and stretch 16a of belt 16 to express blood from the blood vessels and to remove other fluids from the ham body 10 which are delivered through the exposed flesh portions of the hams. Elements 26 in association with stretch 16a of belt 16 also contribute to the massaging action imparted to the hams. In lieu of the crank and crankshaft arrangement schematically depicted in FIG. 1A, rhythmically operable pistons joined to respective elements 26 may be used to sequentially raise and lower the elements in a timed manner equivalent to the crankshaft structure described above.

The cyclical up and down motion of elements 26 in combination with the pressure applied by frusto-conical rollers 18 conditions the hams 10 in a manner for quick and uniform absorption of the salt-based curing composition.

Phase II—Pre-Salting

Hams 10 existing from unit 14 are directed onto an exit conveyor 34 aligned with transport conveyor 36. Retractable blade pusher 38 forming a part of pre-salting apparatus 40 is operable to engage the backside of each ham 10 as it approaches the left hand side of conveyor 36 as shown in FIG. 1A. Pusher 38, which is reciprocal back and forth in timed relationship to conveyor 36, is hinged at the top in such a way that a ham may move under the paddle portion of the pusher. After a ham has been moved forwardly a sufficient distance by the pusher paddle, it falls down behind the ham and serves to push the ham to the left of viewing FIG. 1A.

Pre-salter 40 includes a horizontal mechanical abrader 42 having a flexible mesh cylinder 44 made up of a series of interconnected stainless steel mesh links. Mesh cylinder 44 is caused to rotate in the direction of the arrow as illustrated in FIG. 1A. The linked mesh making up cylinder 44 is sufficiently flexible in nature that when rotated at a relatively high speed, centrifugal force causes the mesh material to be forced in an outward direction. Curing agent, including a major proportion of salt, is introduced into the interior of the cylinder 44 through one axial end thereof. The pusher 38 serves to move each ham 10 over the top rotating surface of abrader 42. Thus, by virtue of rotation of mesh cylinder 44 at a significantly faster peripheral speed than the forward motion of pusher 38 and the speed of movement of conveyor 36, the mesh of the cylinder serves to abrade and roughen the skin portion of a ham 10 passing over the cylinder 44.

Salt-based curing agent is introduced into the interior of the cylinder 44 through one axial end thereof. Water is preferably added to the curing composition to form a damp mixture that may pass through the openings of the mesh. The damp composition is better able to adhere to the underside of the skin portion of the ham than would be the case with a totally dry curing agent.

Pre-salting apparatus 40 also includes a pair of abraders 46 comprising upright, horizontally spaced, flexible mesh cylinders 48 located above conveyor 50 and aligned horizontally transversely of the path of travel of the hams. Cylinders 48 rotate in opposite directions with the most adjacent surfaces thereof approaching each other and moving toward the left viewing FIG. 1A and thereby in the direction of movement of conveyor 50. Each of the cylinders 48 is also made up of a series of interconnected stainless steel links, similar to the construction of cylinder 44. Cylinders 48 are each rotated at a peripheral speed similar to the rate of rotation of cylinder 44 and thereby faster than the forward movement of conveyor 50. The spacing between the adjacent peripheries of cylinders 48 is less than the normal horizontal width of hams 10. As a consequence, the mesh cylinders 46 also abrade and roughen the skin portion of a ham 10 passing therebetween. Supply conduits 52 function to continuously deliver a quantity of damp salt-based curing agent to the interior of each of the cylinders 48.

The curing agent applied to the ham in Phase II is preferably a combination on a percent by weight basis of 94.94% sodium chloride, 3.94% sodium nitrate and 1.12% sodium nitrite. Sufficient water is added to the initially dry ingredients to produce a damp mixture which tends to adhere to the surface of a ham. When applied vigorously and thoroughly to a ham, the nitrate and nitrite are useful in killing any bacteria that might be present on the surface of a ham body.

Thus, as the hams 10 are conveyed through pre-salting apparatus 40, the underside of the skin portion of each ham 10 is abraded and roughened as curing agent is directed against such surface of the ham. In like manner, as the hams 10 are caused to pass between rapidly rotating mesh cylinders 48, the links of the mesh abrade and roughen the surface of the skin portion of the ham while curing agent, which passes through the mesh of the cylinders is directed onto the roughened surfaces of the hams. The intense rubbing that each ham is subjected to by the stainless steel mesh netting of cylinders 44 and 48 stimulate movement of the muscle bands of the outer skin of the ham and forces pores in the rind to dilate, thus facilitating the expulsion of moisture inside of the ham. The aggressive rubbing of the curing compound on the skin portion of the ham is much more thorough than could be accomplished manually. As a result, the curing agent which passes through the link mesh of each of the cylinders and is thereby applied to the hams tends to remain on the outer skin portion of each ham not only because of the damp nature of the agent, but also because of the unique way in which the skin surfaces have been abraded and roughened.

Phase III—Cure Dispensing

Upon leaving the pre-salting apparatus 40, hams on conveyor 50 are delivered onto conveyor 54 underlying the main salting apparatus 56. Funnel shape dispenser 58 directly overlying conveyor 54 has a frusto-conical main curing agent receptacle section 58a and a spout section 58b for delivering curing agent 62 onto the top of a ham 10 as it passes directly beneath salting apparatus 56.

Mechanism (not shown) is connected to dispenser 58 to reciprocate the latter in the direction of the arrows. The curing mixture is introduced into the top of the funnel shaped dispenser 58 and is held in the cure holding reciprocal section 58a until a ham starts to pass under the spout section 58b. At that time, a pre-determined amount of curing agent is dispensed onto the top of the ham as it passes directly under the spout 58b. It is preferred that a worker be stationed adjacent the main salting apparatus 56 to verify that the curing mixture is properly spread over the top portion of each ham.

The cure mixture delivered from dispenser 58 preferably contains on a percent by weight basis 77.59% sodium chloride, 16.0% sugar, 2.27% pepper, 3.22% sodium nitrate and 0.92% sodium nitrite. The only essential ingredient of the curing agent is salt, most preferably sodium chloride, which may be provided in any majority proportion of the dry curing agent. This salt proportion preferably exceeds 70% by weight of the curing agent, and more preferably exceeds 80%.

Other ingredients may optionally be provided in the curing agent. Potassium chloride may be added or substituted for at least a portion of the sodium chloride, in amounts up to 50% of the sodium chloride proportion, and more preferably up to 30% for the purpose of reducing the sodium content of the ham. Sodium erythorbate may be added in amounts to provide up to 547 ppm in the finished product, as prescribed by regulation. Sodium erythorbate functions as a curing accelerator and color fixing additive, but amounts over the regulatory limit tend to produce undesirable levels of nitrous amines. Vitamin E, while not strictly a dry ingredient, may be added in a quantity approximately equal to or greater than the sodium erythorbate portion to prevent the formation of various carcinogens.

The total amount of curing agent applied to each ham body 10 should be sufficient such that upon completion of the curing process, the finished ham contains a sodium chloride salt content adequate to preserve the ham. Although a 4% by weight sodium chloride level in the ham complies with current U.S.D.A. regulations, most processors take steps to obtain a significantly higher salt content to prevent product spoilage. This is done because of the difficulty in obtaining uniform dispersion of salt within the meat at lower levels, including the approved 4% salt concentration. The present process permits required full curing of hams at total sodium chloride levels as low as about 2.5% to 3.5% by weight of the ham by virtue of the unique manner in which the curing agent is uniformly distributed throughout each ham. However, higher sodium chloride concentrations may be provided utilizing the present process if a final ham product having a generally saltier taste is preferred, for example, up to about 7% or 8% by weight. The salt proportion in the finished ham will include salt that is initially present in the ham, as well as salt that is introduced to the ham from the curing agent itself by diffusion and osmotic transfer of the natural ham juices, as well as capillary forces.

In instances where it is preferred to process hams without a pre-salting step, and with the entire curing agent being added during Phase III, the cure applied in one step may contain on a weight basis, 83.07% NaCl, 10.94% brown sugar, 3.45% sodium nitrate, 1.56% black pepper and 0.98% sodium nitrite.

Phase IV—Bagging and Final Blood and Fluid Expression

Conveyors 64 convey the ham with the curing agent thereon to a bag loader 66 shown schematically in FIG. 1A. An air impervious, heat shrinkable, synthetic resin barrier enclosure in the nature of bag 68 is placed over and around the ham containing the freshly applied curing mixture. Enclosure 68 may take a number of different equivalent forms. Pre-prepared bags may, for example, may be positioned to receive a respective individual ham as depicted in FIG. 1A.

The bagged hams are directed to a Rotomat machine 70 where a nozzle 72 is placed inside the bag 68 and the air removed from the bag containing the ham as the latter circles around the Rotomat machine. The initially open end of the bag 68 is sealed or clipped to permit exclusion of air from the interior of the bag, and at the same time a vacuum is drawn inside of the bag to provide an atmosphere that preferably represents an absolute pressure of less than about 50% of atmospheric pressure, and desirably less than 20% of atmospheric pressure. Even more preferably, the vacuum condition established within each bag 68 represents an absolute pressure of less than about 5 millibars of pressure, or the minimal pressure obtainable at the boiling point of remaining fluids within the ham.

An alternative packaging method may involve utilization of a form, fill and seal machine for packaging the individual hams for storage and curing. A typical form, fill and seal machine usable in carrying out the process steps hereof is available from MULTIVAC, a German corporation having its headquarters in Kansas City, Mo.

The form, fill, and seal operation proceeds on an assembly line basis including parallel sheets of rolled plastic material extending in superposed relationship over one or more ham-receiving wells. The bottom sheet or carrier layer passes over a flat surface that sinks down into a well responsive to a first vacuum originating from the well area. The ham is manually placed inside the well on top of the carrier, and a second vacuum is drawn within the well to pull the top or web layer down over the ham and into contact with the underlying carrier layer. This vacuum represents the desired absolute pressure of less than about 50% of atmospheric pressure, and preferably less than about 5 millibars. A thermal element is then activated to melt together the web and carrier along a sealing zone, thus isolating the vacuum interior or ham-side of the resulting sealed pouch from the atmosphere. A chain of packaged hams each inside a respective well is sequentially advanced towards a separation station, where the vacuum-packaged hams are separately placed into a common bin.

As an alternative to the MULTIVAC form, fill, and seal operation, an analogous vacuum-bag packaging operation may be conducted on equipment obtained from CRYOVAC, a division of W.R. Grace & Co. of Duncan, S.C. The CRYOVAC packages may also be subjected to a shrinking step including a brief immersion in water having a temperature ranging between from about 150° F. to about 210° F., depending upon the nature of the plastic packaging material. A preferred temperature is in the range of 180° F. to 200° F. The temperature used should be sufficient to cause specialized plastic packaging materials to contract and conform to their contents.

In the case of a ham which is not bagged by use of a form, fill and seal machine, it is desirable to subject the packaging material surrounding the ham to a thermal shrink step, although shrinkage of the film into conforming relationship to the ham is not an absolute requisite. In those instances though where shrinkage of the film into engagement with the surface of the ham is desired, conveyor 64 directs the bagged ham to a shrink tunnel 76. Steam, and/or hot water at a temperature of at least about 150° F. to about 210° F. and preferably 180° F. to 200° F., is directed onto the bagged ham through appropriate nozzle means 78 to cause the synthetic resin barrier envelope to shrink into tight confining relationship to the ham body.

Upon exit from the shrink tunnel 76, each of the hams is delivered into a air-drying accumulation space 80. The hams are allowed to remain in space 80 for a residence time of at least a few seconds, for example 15 to 20 seconds, and preferably for a time of about 5 minutes. The vacuum condition that exists within bag 68 enclosing each ham 10 allows substantially the full force of atmospheric pressure to be exerted on all sides of the ham enclosed in the bag. The atmospheric pressure of almost 14.7 lbs/sq. in. applied to the exterior of the bagged ham causes any blood or other fluids still trapped in the ham that were not fully extracted by treatment in unit 14 to be forced from the ham body. In addition, in those instances where the film is subjected to a thermal shrink step, the pressure of the film on the ham contributes to the expression of fluids and any remaining blood from the ham body.

Phase V—Bag Perforation and Final Cure

After the bagged hams 10 have been allowed to remain in the accumulation space 80 for the final fluid and blood expression period of Phase IV, holes 84 are punctured in the bag or slits 84 are formed in the film with a knife 86 or equivalent means to allow air to re-enter the interior of the enclosure 68. Alternatively, the end and bottom of the bag may be cut in such a way as to allow free entrance of air into the air which was previously under a vacuum. The hams which are now subjected to full atmospheric pressure are placed in a container 82. When the container 82 is full, it is moved from the curing room area and placed in curing coolers.

The elapsed time between bagging of the ham and puncturing of the bag to allow air to re-enter the interior of each enclosure 68 may be varied, but the time that the ham is maintained under a vacuum within the enclosure 68 should not be of a duration causing the fluid and any remaining blood expressed from the ham body to impart an undesirable metallic or medicinal taste to the meat product. Although it has been found that a residence time of a few seconds to about 5 minutes between bagging and puncturing of the bag accomplishes requisite expression of residual fluid and blood from the packaged ham, the time the ham is maintained in the bag under vacuum may under certain circumstances be extended to several days, provided proper steps are taken to avoid undesirable alteration of the taste of the ham. If the vacuum residence time is extended beyond about 5 minutes, and particularly at such time is of the order of several days, the product should be checked carefully for evidence of taste and flavor alteration. Generally speaking, the holding time under vacuum should not exceed about 20 to 25 days.

The bin of packaged hams is taken to a curing room, which is commonly referred to as a "Wintertime Room." The temperature inside this room is preferably maintained in a range between 32° F. and 45° F. and, more preferably, between about 36° F. and 40° F.

The hams are placed on wooden racks or similar holding devices inside the curing room for a time preferably exceeding 1.2 days per pound of the largest ham of the group newly introduced into the curing room. This time may be extended to about 1.5 days or longer per pound of the largest ham if preferred for flavor enhancement considerations. Of course, the smaller hams will be cured well in advance of the minimal time, so it is operationally preferable to handle the commonly sized hams as a group to the extent that it is operationally feasible to do it.

The purpose of exposing the ham to a chilled temperature over this period of time is to allow the salt-based curing agent or preservative to be absorbed into the ham, while the cold temperature protects the ham against spoilage. Salt absorption is slower and tends to be less uniform in a cold product than would be the case if it were warmer. The process hereof overcomes this absorption deficit to a large extent by increasing the efficiency of the salt absorption, particularly during the initial cure phase where the ham is subjected to initial massaging and vein pressing, and is then bagged under vacuum conditions which enhances purging of blood and other fluids from the ham body as well as absorption of curing agent.

After the hams have been cured at the prescribed temperature for the prescribed time, the individual hams are removed from their non-vacuum pouch covering for exposure to a drying/equalization step. Each ham may be inserted into a stockinette, which is then tied in a knot to retain the ham. Alternatively, the hams may simply be hung without a stockinette. Hams suspended from a suitable rack unit are then wheeled into a "Springtime Room" where the hams are exposed to a temperature of about 50° F. to 65° F., and preferably about 55° F. to 60° F. for a period of about 5 days to about 40 days, and preferably 20–30 days. This drying step is conducted for a period of time sufficient to remove moisture from the pork to produce a moisture/protein relationship that is low enough to make the product nonperishable at the salt concentration of at least about 2.5% to 3.5%.

After the drying step, the rack containing the dried hams is placed in a "Summertime Room," which is maintained at a time-temperature relationship minimally defined by 9 C.F.R. §318.10(c)(3)(iv) TABLE 5, e.g., approximately 75° F. for 35 days or 130° F. for 1.5 days, with 90° F. for 11 days being most preferred. This aging step serves to produce the unique taste that is associated with dry-cured country hams, and also renders the ham Trichina-free.

Optionally, the aged ham is next wheeled on its rack to a smokehouse where wood or sawdust is burned to create a dense smoke that circulates around the ham. The ham remains in the smoke room for about 48 hours for flavor enhancement and the production of a golden brown appearance prior to final packaging, or further processing, and delivery to the consumer. As an alternative, liquid smoke may be applied to the hams.

EXAMPLE I

A study was performed to ascertain the effect of reduced sodium chloride content upon the rate of spoilage of hams cured in accordance with the preferred process hereof, and the effect on flavor. The hams were cured using process Phases I–V previously described with the percent of salt on fresh ham, the time of initial cure under vacuum, the time of final cure and the percent of salt in the finished product as follows:

| Test No. | Percent Salt on Fresh Ham | Time left in Vacuum | Time left in Cure | Percent Salt Finished Product |
|---|---|---|---|---|
| 1 | 3.75% | 45 days | 45 days | 3.38% |
| 2 | 4.00% | 45 days | 45 days | 3.60% |
| 3 | 4.00% (approx) | 5 min. | 45 days | 3.14% |
| 4 | 4.00% (approx) | 5 min. | 45 days | 2.65% |
| 5 | 4.25% | 45 days | 45 days | 3.54% |

The hams processed in accordance with Tests 3 and 4 of the above table were found to have an exceptional flavor without any hint of a spoilage or metallic or medicinal taste. The lower sodium content of the hams also offers significant dietary advantages.

Many of the hams of tests 1, 2 and 5, however, did exhibit somewhat undesirable taste characteristics because of the extended residence under vacuum.

EXAMPLE II

The percent salt on each fresh ham, time left in cure and percent salt in the finished product in accordance with current curing procedures used by the assignee hereof is as follows:

| Test No. | Percent Salt on Fresh Ham | Time Left in Vacuum | Time Left in Cure | Percent Salt Finished Product |
|---|---|---|---|---|
| 6 | 4.75% | N/A | 60 days | 4.44% |

EXAMPLE III

The percent salt on a fresh ham, time left in cure and percent salt in the finished product in accordance with the current industry average is as follows:

| Test No. | Percent Salt on Fresh Ham | Time Left in Vacuum | Time Left in Cure | Percent Salt Finished Product |
|---|---|---|---|---|
| 7 | 5.00–8.00% | N/A | 30–40 days | 5.00–6.00% |

In consideration of health and marketing concerns, it has been determined that the application of a curing agent allotment having a low sodium chloride content equal to at least about 2.5% to 3.5% of the weight of the untreated ham product will provide an acceptable unspoiled finished ham product, if the ham processing phases of this invention are practiced, particularly with respect to bagging the ham in an air impervious enclosure, removing air from that enclosure, maintaining the ham under vacuum conditions for several seconds and preferably not more than a few minutes, and then finally curing the ham while exposed to atmospheric conditions. Low sodium hams may be produced according to the method of the invention to have sodium chloride contents ranging between about 3.0% and 3.9%, with hams having sodium chloride contents from about 3.4% to 3.9% being particularly preferred.

By way of example, a processor conventionally producing twenty-five pound hams would expect to require a pre-scribed minimum of 50 days in the curing room. Some processors, however, might prefer to extend this minimal time for an additional 10 day enzymatic flavor-enhancement period, resulting in an overall curing time of 60 days. In contrast, the present method permits development of approximately the same flavoring in the finished ham product over an overall holding period of no more than about 40 days. This 40 day period includes 30 days for holding twenty-five pound hams at 1.2 days per ham, and an additional 10 day flavor-enhancing period prior to the drying step.

I claim:

1. A method of dry curing a ham body having an outer skin portion and an exposed flesh portion, said method comprising the steps of:

subjecting the ham body to a combination massaging action and intermittent vein compressing force, of from about 0.5 to about 2.5 kg/cm$^2$, sufficient to displace a substantial proportion of any residual blood and other fluids in the ham body through the exposed flesh portion thereof;

thereafter mechanically abrading and toughening the skin portion of the ham body while stimulating movement of the skin to force the pores thereof to dilate and thus facilitate expulsion of moisture inside of the ham;

applying a damp salt based pre-salt composition to the skin portion of the ham body during said mechanical abrading and roughening thereof;

thereafter directing a sufficient amount of a dry, salt-based curing agent onto the ham body to coat at least the exposed flesh portion of the ham body, the amount of said curing agent applied to the ham body being sufficient to cause the salt present in said curing agent and in said pre-salt composition to permeate the ham body and provide a final salt content of at least about 2.5% by weight of the ham body to thereby act as a preservative in the finished product when the ham body is subjected to curing conditions at a temperature from about 32° F. to about 45° F. for a time period of at least about 1.5 days per pound of ham;

placing packaging material in surrounding relationship to the salt permeated ham body presenting an enclosure therefor;

maintaining each packaged ham under curing conditions within said range of about 32° F. to about 45° F. for a time period of at least 1.5 days per pound of the ham body to allow the salt-based curing agent to be absorbed into the ham body;

removing the ham body from said packaging material; then hanging the unpackaged ham body from a rack unit while exposing the ham body to a temperature of from about 50° F. to 65° F. for a period from about 5 days to about 40 days, which is sufficient to remove adequate moisture from the ham body to cause the ham body to be substantially non-perishable at the salt concentration therein; and then aging the ham body by maintaining the ham body at a temperature of from about 130° F. for about 1.5 days to a temperature of about 75° F. for about 35 days to render the ham body trichinae free.

2. The method as set forth in claim 1 wherein the step of placing packaging material around the ham body includes enclosing the ham body in a substantially air impervious enclosure and removing a substantial proportion of the air from within the enclosure to create an environment therein which is below ambient pressure, maintaining the ham body within said enclosure at said below ambient pressure for a final fluid expression period of at least about 15 seconds and sufficient to cause any blood or other fluids remaining in the ham body to substantially be expressed therefrom, and then allowing ambient air to reenter the enclosure at the conclusion of said final fluid expression period until substantially ambient air pressure conditions are reestablished in the enclosure.

3. The method as set forth in claim 2, wherein said step of enclosing the ham body in said enclosure includes the step of placing a heat shrinkable synthetic resin film around the ham body, and causing the resin film to shrink into generally complemental, compressive engagement with the outer surface of the ham body.

* * * * *